United States Patent
Cardine et al.

(10) Patent No.: US 7,043,878 B2
(45) Date of Patent: May 16, 2006

(54) CABRIOLET DOOR WITH ADJUSTABLE WINDOW REGULATOR RAIL AND CORRESPONDING METHOD OF ASSEMBLY

(75) Inventors: Patrice Cardine, Neuvy En Sullias (FR); Denis Chevy, Neuvy En Sullias (FR)

(73) Assignee: Meritor Light Vehicle Systems-France, Sully-sur-Loire (FR)

( * ) Notice: Subject to any disclaimer, the term of this patent is extended or adjusted under 35 U.S.C. 154(b) by 0 days.

(21) Appl. No.: 10/233,907

(22) Filed: Sep. 3, 2002

(65) Prior Publication Data

US 2003/0066243 A1  Apr. 10, 2003

(30) Foreign Application Priority Data

Sep. 4, 2001  (FR) .................................. 01 11420

(51) Int. Cl.
    *E05D 15/10* (2006.01)
(52) U.S. Cl. ...................................................... 49/212
(58) Field of Classification Search ................. 49/209, 49/212, 348, 502; 411/395, 389, 400, 401
    See application file for complete search history.

(56) References Cited

U.S. PATENT DOCUMENTS

| | | | |
|---|---|---|---|
| 3,273,285 A | 9/1966 | Champion | |
| 3,844,064 A | 10/1974 | Yamaha et al. | |
| 4,642,010 A * | 2/1987 | Bradley et al. | 411/69 |
| 4,956,942 A | 9/1990 | Lisak et al. | |
| 5,632,121 A | 5/1997 | Handte et al. | |
| 5,867,942 A * | 2/1999 | Kowalski | 49/502 |
| 5,927,021 A * | 7/1999 | Kowalski et al. | 49/502 |
| 5,960,588 A | 10/1999 | Wurm et al. | |
| 6,270,304 B1 * | 8/2001 | Freedland | 411/392 |
| 6,430,756 B1 * | 8/2002 | Reilly | 4/252.1 |

FOREIGN PATENT DOCUMENTS

FR  2563295 A1 * 10/1985
WO  WO98/16709  4/1998

OTHER PUBLICATIONS

French Preliminary Search Report for FR 01 11 420 dated May 24, 2002.

\* cited by examiner

*Primary Examiner*—Jerry Redman
(74) *Attorney, Agent, or Firm*—Carlson, Gaskey & Olds

(57) ABSTRACT

A window regulator and method for assembling a vehicle door incorporating it are provided. The method comprises inserting the screw thread of a screw with two heads into the screw thread of a plate secured to an outer panel of the door. The screw passes through an oblong hole in a lug substantially perpendicular to a slider guide of a window regulator rail. The transverse position of the rail with respect to the screw is adjusted. The screw is tightened using its upper head. The screw is loosened later using the lower screw head. The adjustment of the transverse position of the rail is then tweaked and the screw is tightened again using the lower screw head. This makes assembling and adjusting the transverse position of a window in a vehicle door easier.

15 Claims, 1 Drawing Sheet

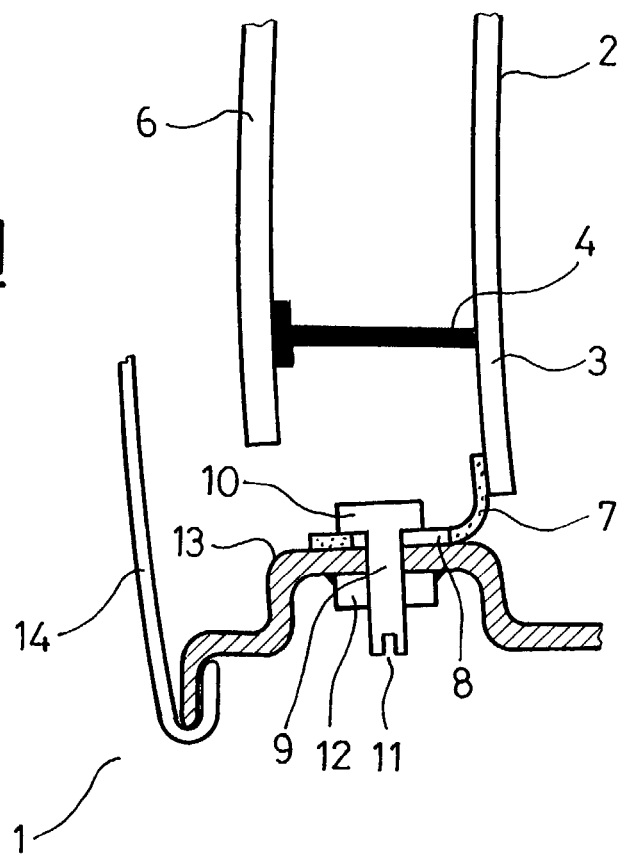
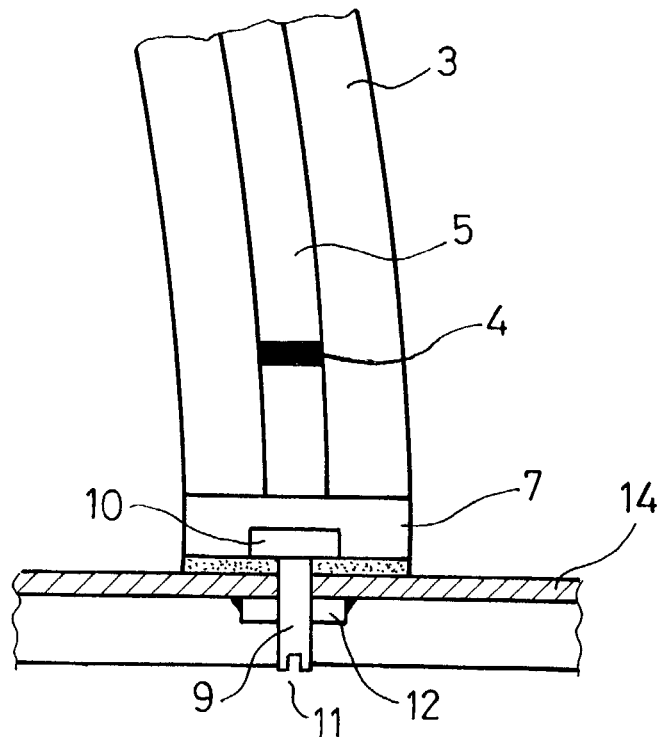

US 7,043,878 B2

CABRIOLET DOOR WITH ADJUSTABLE WINDOW REGULATOR RAIL AND CORRESPONDING METHOD OF ASSEMBLY

This application claims priority to French patent application number 01 11 420 filed Sep. 4, 2001.

BACKGROUND OF THE INVENTION

The invention relates to automobile doors and window regulators, and particularly to doors and window regulators for cabriolets or convertibles.

Cabriolets are known, in particular the Peugeot 206CC, in which the door has no window frame. In this case, it is then particularly important to adjust the position of the top of the window in the transverse direction of the vehicle.

The Peugeot 206CC has a door window regulator with a rail that is adjustable in the transverse direction. The window regulator comprises two rails running vertically inside a front door. These rails have a slider guide groove. A lug is fixed to the lower part of the rail. This lug forms approximately an angle of about 90° with respect to the rail and thus projects in the transverse direction of the vehicle. A screw is welded to this lug. A bridging piece is arranged against a lower sheet metal return of the door or of the chassis. The return has an opening for accessing the bridging piece. The bridging piece has an oblong hole running in the transverse direction of the vehicle. The screw passes through the oblong hole and is fixed by a nut to the bridging piece. During assembly on a production line, the nut is fitted and tightened from the underside of the door. As far as the operator is concerned, this is a tricky and not very ergonomic way of fitting the nut.

U.S. Pat. No. 3,844,064 discloses a guiding mechanism for slidable curved window panes of automotive vehicles, which involves a transversally mounted adjusting screw for effecting adjustable final positioning of the guide rail. The adjusting screw is visible and therefore accessible from the inside of the vehicle, which may cause an accidental manipulation from the user.

U.S. Pat. No. 4,956,942 discloses several window adjustment apparatuses, wherein the lower end of the guide channel is remotely controlled, requiring thereby the embodiment of an additional housing and an adjustment member.

Both U.S. Pat. Nos. 5,960,588 and 5,632,121 describe adjusting devices for automobile window panes, wherein the transverse positioning of the window pane is effected by means of bolted connections. These fastening elements are accessible only from the underside of the door body, the manipulation of which is not easy nor very ergonomic.

A still further means is known from WO-A-98 16709, which proposes making use of a coarse and a fine adjust bolts for the coarse and fine adjustment steps, respectively. The operator is therefore required to manipulate two separate bolts on two different locations.

U.S. Pat. No. 3,273,285 discusses a window regulator mechanism for positioning a window glass member in the course of its vertical movement.

SUMMARY OF THE INVENTION

There is therefore a requirement for a window regulator, which solves one or more of the problems mentioned above.

In an embodiment, the invention thus provides a window regulator assembly comprising: a window regulator having a slider guide rail, a surface substantially perpendicular to the guide rail, an elongated hole being provided in the surface; a panel with a plate fixed with respect to the panel, said plate having a screw thread; a screw having a first and a second end, a first and second drive heads at said first and second ends, one head of the screw being adapted to pass through said elongated hole and through said screw thread; wherein the screw passes through the elongated hole and is engaged into the screw thread.

In another embodiment, the panel is an outer panel of a vehicle door.

In yet another embodiment, one head of the screw is accessible from the underside of the vehicle door.

In yet another embodiment, another head of the screw is accessible from the inside of the vehicle door.

In yet another embodiment, the screw is substantially vertical.

The invention also provides a kit of parts comprising a window regulator having a slider guide rail, a surface substantially perpendicular to the guide rail, an elongated hole being provided in the surface; a screw having a first and a second end, a first and second drive heads at said first and second ends, one head of the screw being adapted to pass through said elongated hole.

The invention further provides a method for mounting a window regulator in a vehicle door, the window regulator having a slider guide rail, a surface substantially perpendicular to the guide rail, an elongated hole being provided in the surface; the vehicle door comprising a panel with a plate fixed with respect to the panel, said plate having a screw thread; the method comprising the steps of: inserting one head of a screw through said elongated hole, said screw having a first and a second end with a first and second drive heads at said first and second ends; engaging said screw into said screw thread; adjusting the transverse position of the rail with respect to said screw; tightening the screw into said screw thread.

In another embodiment, the step of the inserting is carried out from the inside of the vehicle door.

The invention also provides a method for a fine adjustment of the position of a window regulator in an assembly, comprising a window regulator having a slider guide rail, a surface substantially perpendicular to the guide rail, an elongated hole being provided in the surface; a panel with a plate fixed with respect to the panel, said plate having a screw thread and a screw having a first and a second end and a first and second drive heads at said first and second ends, one head of the screw passing through said elongated hole and through said screw thread; the method comprising the steps of: loosening the screw using said one head; fine adjusting the transverse position of the surface with respect to the screw; tightening the screw using said one head.

In another embodiment, the panel is an outer panel of a vehicle door and the steps of loosening and tightening are carried out from the underside of said door.

BRIEF DESCRIPTION OF THE DRAWINGS

FIG. 1 a view in cross section of a part of a door according to the invention;

FIG. 2 a view in longitudinal section of the door of FIG. 1.

DETAILED DESCRIPTION OF PREFERRED EMBODIMENT

The invention involves assembling a window regulator rail on a door or a chassis by means of a vertical two-headed screw. The upper head is used to carry out a first adjustment of the transverse position of the rail. The lower head is used to tweak the adjustment of the transverse position of the rail.

In the description which follows, the transverse direction corresponds to the normal to the mean plane of the door or of a lateral bodywork panel as appropriate.

FIGS. 1 and 2 show a door 1 comprising a window regulator rail 2 according to the invention. The window regulator rail 2 has a slider guide 3. The slider 4 slides in this guide, which may, for example, be produced in the form of a slot 5. The guide 3 allows the slider 4 to slide during the upward or downward travel of the slider 4. The slider 4 is secured to a window 6. The rail 2 has a lug 7 which is arranged approximately at right angles to the guide 3.

The lug 7 has an oblong hole 8 extending in the transverse direction of the door 1 or chassis as appropriate. A double-headed screw 9 is inserted into the oblong hole 8. The screw 9 has an upper head 10 and a lower head 11. The screw thread of the screw 9 is inserted in a screw thread of a corresponding nut 12. The nut 12 is fixed by welding to a bridging piece 13. The bridging piece 13 is preferably produced in the bottom of the door 1, in the region where the lower end of the rail 2 is to be situated. The nut 12 is fixed to a flat surface or to a plate of the bridging piece 13.

The lug 7 may for example be produced in a fold of sheet metal of the guide rail or using an attached and welded part, as appropriate. The upper surface of the lug 7 forms a bearing surface for the upper screw head 10, so that this screw head 10 can apply a compressive force to the lug 7. The lower surface of the lug 7 forms a bearing surface to come into contact with a corresponding surface of the bridging piece 13.

The oblong hole 8 allows the guide 3 to be slid transversely with respect to the screw 9 during adjustment. Thus, when the screw 9 is held in place without being tightened, the lug 7 is free to slide to set the transverse position of the rail 2 with respect to the outer panel 14. The transverse position of the window 6 can consequently be modified in this way.

When a tightening force is applied between the screw 9 and the nut 12, the contacting surfaces belonging respectively to the bridging piece 13 and to the lug 7 are immobilized by friction. It is also possible to anticipate immobilizing the surfaces of the bridging piece 13 and of the lug 7 respectively using appropriate stops if the friction force between the bridging piece 13 and the lug 7 proves to be insufficient.

The screw 9 is preferably arranged substantially vertically in the door. Thus, access to its two heads 10, 11 is easier. The screw 9 has screw heads 10 and 11 which are suited to being turned using a corresponding tool. The upper screw head 10 allows installation and tightening from above, which is ergonomic and accordingly reduces the time taken to fit and to tighten the screw 9. It is, for example, possible to use a hexagonal upper head 10 to make it easier to grip from a distance. This is because the screw 9 is generally arranged at the bottom of the door at the time of assembly of the rail 2 to the door 1 and it is desirable to make it easier to grip. The lower screw head 11 is used for tightening of loosening from the bottom. Thus, when auxiliary parts of the door 1 have been fitted, such as a window, enclosures, a lock or a protective inner panel, while the upper screw head 10 is difficult to access, access to the lower screw head 11 is still easy so that the transverse position of the window can be adjusted again if necessary, for example in the event of impact. Furthermore, it is preferable to use a lower head 11 of the "headless" type. This head 11 can thus pass through the screw thread of the nut 9. A standard driving recess shape, of the slotted, hexagonal or torx type is preferably chosen, which shapes can be operated using a standard tool.

In the example of FIGS. 1 and 2, the lower screw head 11 opens at the bottom outside of the door. There is thus good access for more precise adjustment once the auxiliary door parts have been fitted. The lower screw head 11 preferably opens into a lower recess of the door. The screw head 11 thus remains fairly unnoticeable to the user. The plate and the recess are then preferably produced in the form of a bridging piece 13, for example by bending or pressing a metal sheet.

The invention also relates to a method of assembling a door. The screw thread of the screw 9 is inserted into the screw thread of the bridging piece 13 or into the nut 12, arranging the lower screw 11 head downward. The transverse position of the screw 9 in the oblong hole is adjusted, for example on a mass-production door assembly line. The screw 9 is tightened using the upper screw head 10. Next, the screw 9 is loosened using the lower screw head 11. The adjustment of the transverse position of the screw 9 in the oblong hole 8 is tweaked, for example at the end of the door assembly line when most of the auxiliary door parts have been assembled. The screw 9 is then tightened to immobilize the transverse position of the screw 9 in the oblong hole 8 and therefore the transverse position of the window and of the rail 2 with respect to the outer panel 14. The transverse position of the screw 9 in the oblong hole 8 has a great influence on the transverse position of the top of the window. This tightening is performed using the lower screw head 11. The screw is tightened using the upper screw head. Next, the screw is loosened using the lower screw head. The adjustment of the transverse position of the screw in the oblong hole is tweaked, for example at the end of the door assembly line when most of the auxiliary door parts have been assembled. The screw is then tightened to immobilize the transverse position of the screw in the oblong hole and therefore the transverse position of the window and of the rail with respect to the outer panel. The transverse position of the screw in the oblong hole has a great influence on the transverse position of the top of the window. This tightening is performed using the lower screw head.

Of course, the present invention is not restricted to the examples and embodiments described and depicted but can be varied in numerous ways accessible to the person skilled in the art. Thus, although a nut attached and welded to the bridging piece has been described herein-above, it is just as possible to use any other appropriate means such as a screw thread produced directly in the thickness of the bridging piece. Furthermore, although the invention has been described mainly in the case of a mounting in a door, the invention applies also to the mounting of this window regulator for the rear seats in a chassis which has no rear doors.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A window regulator assembly comprising:
a window regulator including a slider guide rail and a surface substantially perpendicular to said slider guide rail, said surface including an elongated hole;
a panel;
a plate fixed with respect to said panel;
a member attached to said plate, said member including a screw thread; and
a threaded fastener including a first end having a first drive head and a second end having a second drive head, and both of said first drive head and said second drive head are engageable by a tool, and one of said first drive head and said second drive head of said threaded fastener passes through said elongated hole of said surface and through said screw thread of said member, wherein said threaded fastener passes through said elongated hole and is engaged into said screw thread of said member,
wherein said first drive head is accessible from an interior of a vehicle door and said second drive head is accessible and projects towards an underside of the vehicle door once auxiliary door parts have been fitted in the vehicle door and once said panel is attached to the vehicle door and the vehicle door is fully assembled such that the interior of the vehicle door is fully enclosed from outside of the vehicle door.

2. The assembly of claim 1, wherein said panel is an outer panel of the vehicle door.

3. The assembly of claim 1, wherein said threaded fastener is substantially parallel to said slider guide rail.

4. The assembly of claim 1, further including a slider that slides in said slider guide rail and a window secured to said slider.

5. The assembly of claim 1, wherein said panel is an inner panel of the vehicle door.

6. The assembly of claim 1, wherein said member is a nut including a threaded opening, and said screw thread is threaded into said threaded opening of said nut.

7. The assembly of claim 6, wherein said nut is attached to said plate by welding.

8. The assembly of claim 1, wherein said second drive head is headless.

9. The assembly of claim 1, wherein said second drive head includes a slotted surface.

10. The assembly of claim 1, wherein said surface and said slider guide rail are integrated into one piece.

11. The assembly of claim 1, wherein said elongated hole is substantially oval.

12. A window regulator assembly comprising:
a window regulator including a slider guide rail and a surface substantially perpendicular to said slider guide rail, said surface including an elongated hole; and
a threaded fastener including a first end having a first drive head and a second end having a second drive head, and both of said first drive head and said second drive head are engageable by a tool, and one of said first drive head and said second drive head of said threaded fastener passes through said elongated hole of said surface,
wherein said first drive head is accessible from an interior of a vehicle door and said second drive head is accessible and projects towards an underside of the vehicle door once auxiliary door parts have been fitted in the vehicle door and once a panel is attached to the vehicle door and the vehicle door is fully assembled such that the interior of the vehicle door is fully enclosed from outside of the vehicle door.

13. A window regulator assembly comprising:
a window regulator including a slider guide rail and a surface substantially perpendicular to said slider guide rail, said surface including an elongated hole;
a panel;
a plate fixed with respect to the panel;
a nut attached to said plate, said nut including a threaded opening; and
a threaded fastener including a first end having a first drive head and a second end having a second drive head, and one of said first drive head and said second drive head of said threaded fastener passes through said elongated hole and through said threaded opening of said nut, and both of said first drive head and said second drive head are engageable by a tool to rotate said threaded fastener, wherein said threaded fastener passes through said elongated hole and is engaged into said threaded opening of said nut,
wherein said first drive head is accessible from an interior of a vehicle door and said second drive head is accessible and projects towards an underside of the vehicle door once auxiliary door parts have been fitted in the vehicle door and once said panel is attached to the vehicle door and the vehicle door is fully assembled such that the interior of the vehicle door is fully enclosed from outside of the vehicle door.

14. The assembly or claim 13, wherein said second drive head of said threaded fastener is headless and includes a slotted surface.

15. The assembly of claim 13, wherein said surface and the slider guide rail are integrated into one piece.

* * * * *

UNITED STATES PATENT AND TRADEMARK OFFICE
CERTIFICATE OF CORRECTION

| | | |
|---|---|---|
| PATENT NO. | : 7,043,878 B2 | Page 1 of 1 |
| APPLICATION NO. | : 10/233907 | |
| DATED | : May 16, 2006 | |
| INVENTOR(S) | : Cardine, Patrice and Chevy, Denis | |

It is certified that error appears in the above-identified patent and that said Letters Patent is hereby corrected as shown below:

Column 5, Line 5:
Please delete "clongated" and insert --elongated--

Signed and Sealed this

Nineteenth Day of September, 2006

JON W. DUDAS
*Director of the United States Patent and Trademark Office*